United States Patent
Powell et al.

(10) Patent No.: US 6,223,960 B1
(45) Date of Patent: May 1, 2001

(54) MOTORCYCLE SADDLEBAG

(75) Inventors: Daniel L. Powell, Colgate; Jeffrey F. Schwochert, Hartford, both of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 08/901,801

(22) Filed: Jul. 28, 1997

(51) Int. Cl.[7] .................................................. B62J 9/00
(52) U.S. Cl. ...................... 224/429; 224/433; 224/435; 224/236; 190/125; 24/165
(58) Field of Search .................................. 224/413, 429, 224/430, 431, 435, 439, 235, 236, 655, 433; 190/126, 125; 150/118; 16/293; 292/DIG. 50; 24/165, 194, 196

(56) References Cited

U.S. PATENT DOCUMENTS

| | | | | |
|---|---|---|---|---|
| 1,626,301 | * | 4/1927 | Rhodes | 16/293 |
| 2,099,398 | * | 11/1937 | Jensen | 24/165 |
| 2,998,618 | * | 9/1961 | Rot | 16/293 |
| 3,921,768 | * | 11/1975 | Gorky | 190/26 |
| 3,938,716 | * | 2/1976 | Jackson et al. | 224/153 |
| 3,958,676 | * | 5/1976 | March | 190/126 |
| 4,258,869 | * | 3/1981 | Hilgendorff | 224/413 |
| 4,260,084 | * | 4/1981 | Warren, Jr. | 224/413 |
| 4,402,439 | | 9/1983 | Brown . | |
| 4,629,040 | * | 12/1986 | Jones | 224/435 |
| 4,690,237 | * | 9/1987 | Funabashi et al. | 224/413 |
| 5,515,546 | * | 5/1996 | Shifrin | 224/577 X |
| 5,628,436 | * | 5/1997 | Jones et al. | 224/430 |
| 5,676,293 | * | 10/1997 | Farris | 224/655 X |

FOREIGN PATENT DOCUMENTS

| | | |
|---|---|---|
| 937 307 | 8/1948 | (FR) . |
| 2 274 495 | 1/1976 | (FR) . |
| 2 118 434 | 11/1983 | (GB) . |

OTHER PUBLICATIONS

1998 Motorcycle & Riva Accessories Catalog, p. 15.
1998 Star Catalog, pp. 6–9.
1994 Harley–Davidson Genuine Parts & Accessories Catalog, pp. 18, 56–57 and 104.

* cited by examiner

Primary Examiner—Gregory M. Vidovich
(74) Attorney, Agent, or Firm—Michael Best & Friedrich LLP

(57) ABSTRACT

A motorcycle saddlebag comprising a body formed of a substantially continuous and substantially rigid material (e.g., plastic) having an opening providing access to the interior volume of the body. A body cover made of a flexible material (e.g., leather) is formed over at least a portion of the exterior surface of the body. The saddlebag further includes a lid formed of a substantially rigid material (e.g., plastic) and a lid cover made of a flexible material (e.g., leather) formed over at least a portion of the exterior surface of the lid. A first fastener and a second fastener are connected in series between the lid and the body such that both the first and second fasteners must be fastened to hold the body to the lid. The first fastener can be a strap and buckle fastener, and the second fastener can be a quick-release fastener that is at least partially hidden by the first fastener. A biasing member is arranged to bias the lid open when the lid is near an open position and to bias the lid closed when the lid is near a closed position.

9 Claims, 4 Drawing Sheets

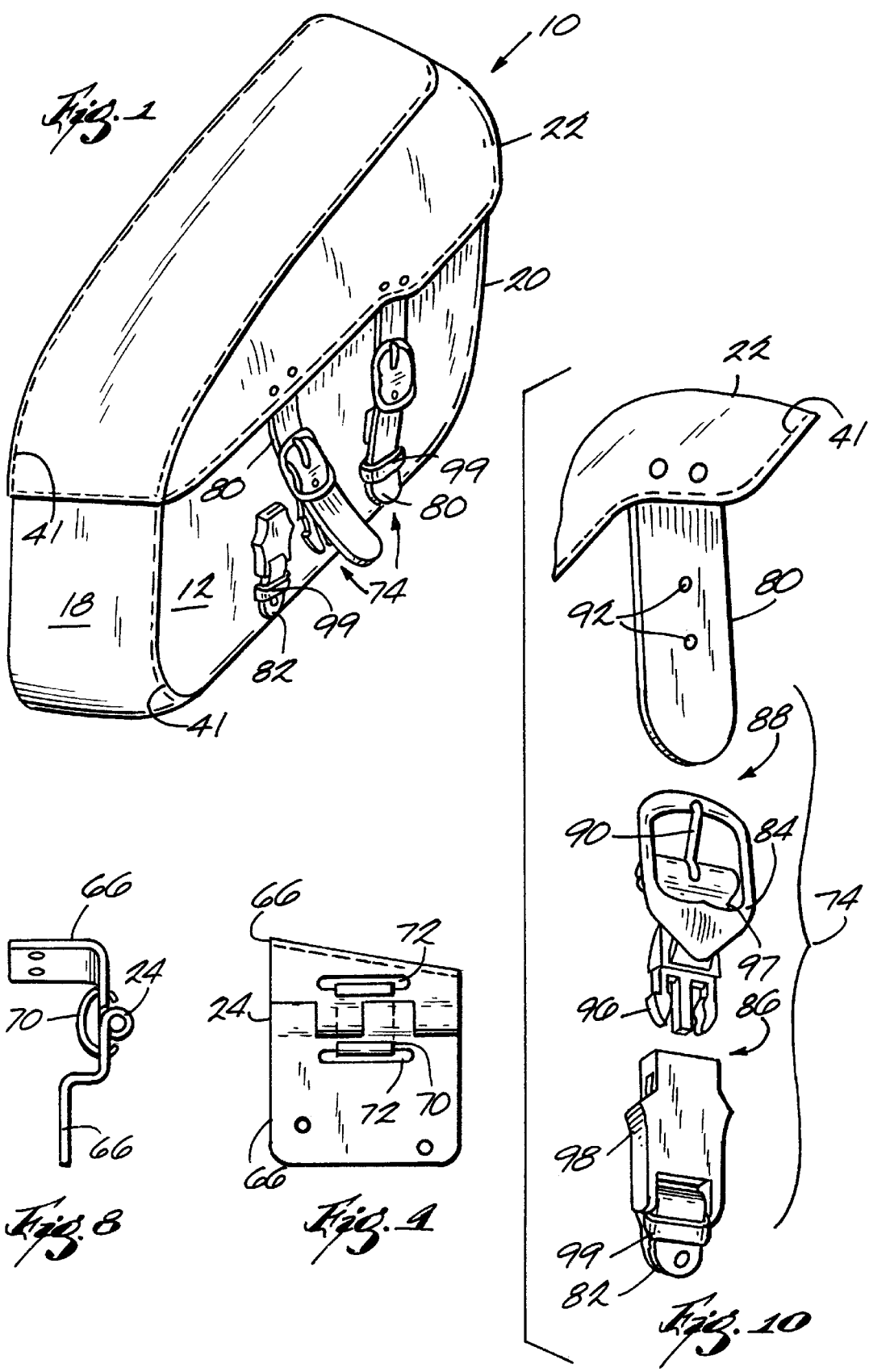

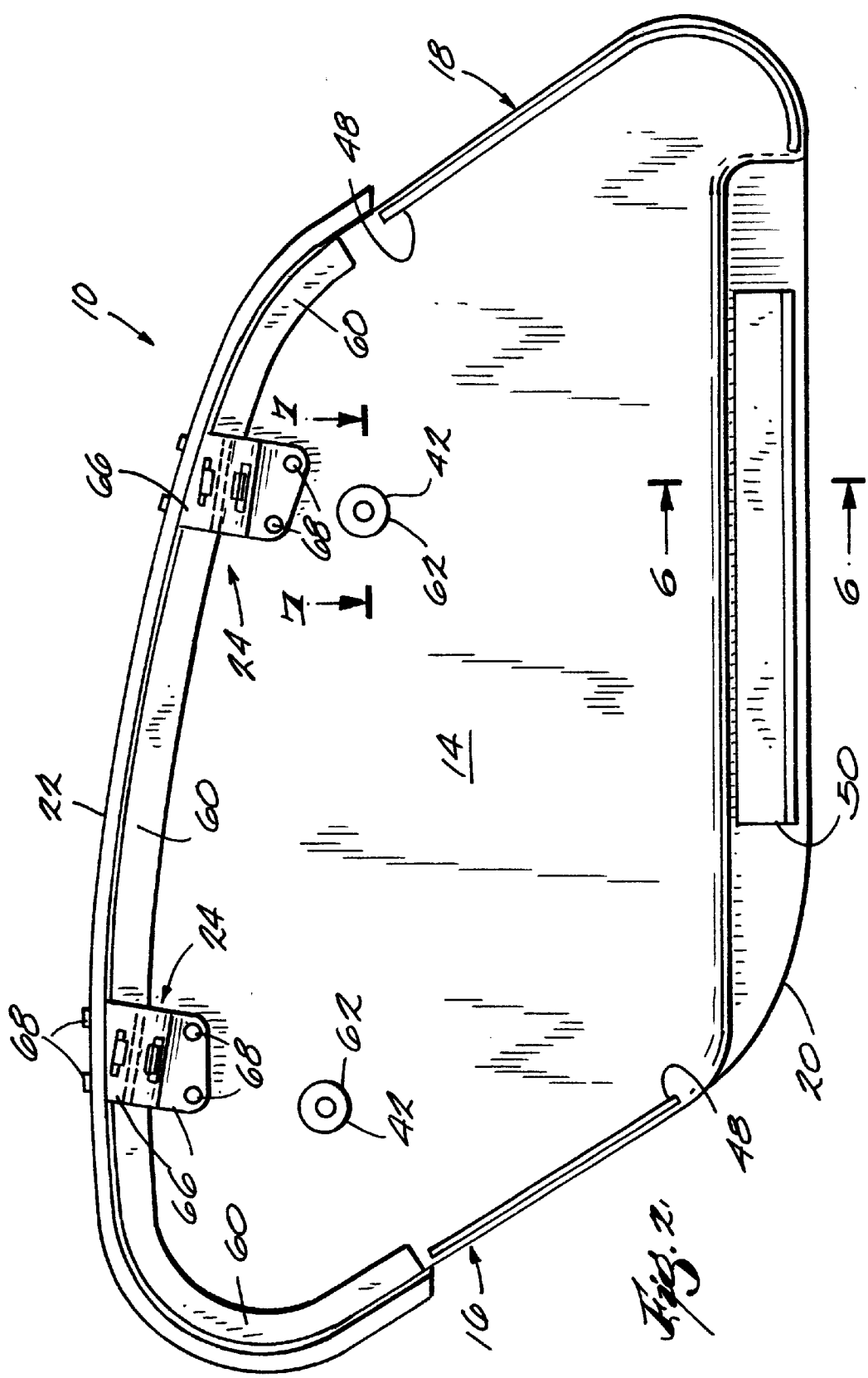

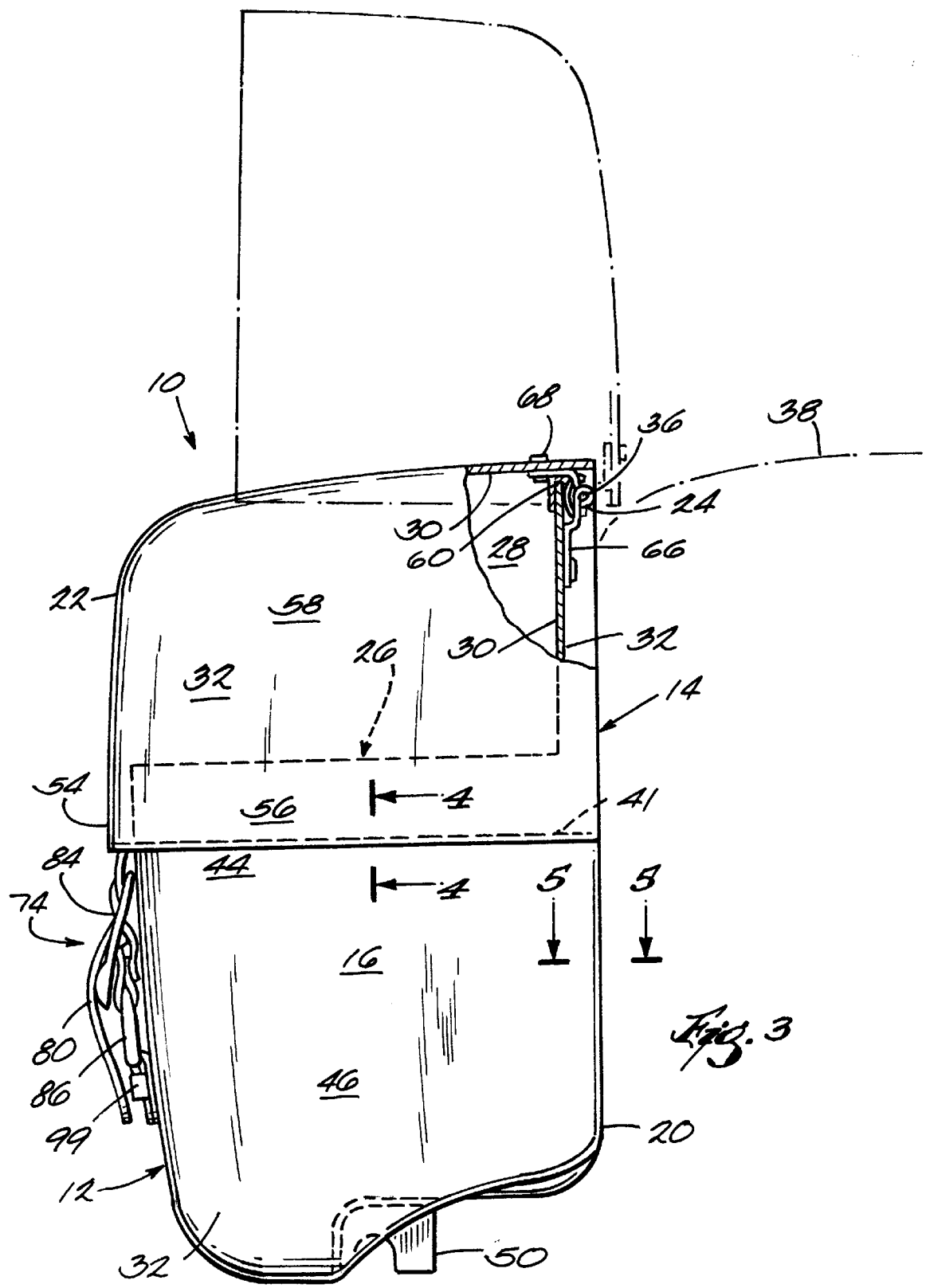

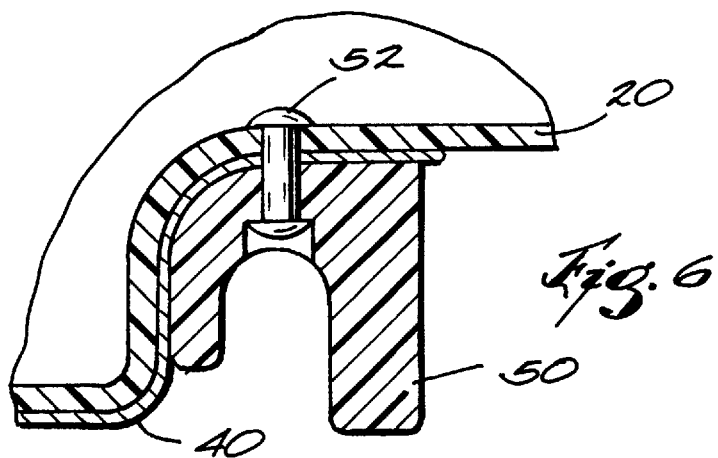
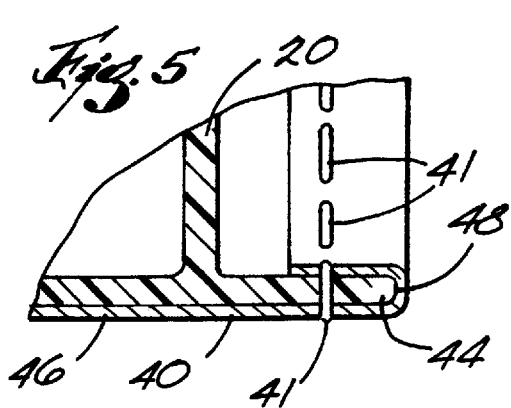
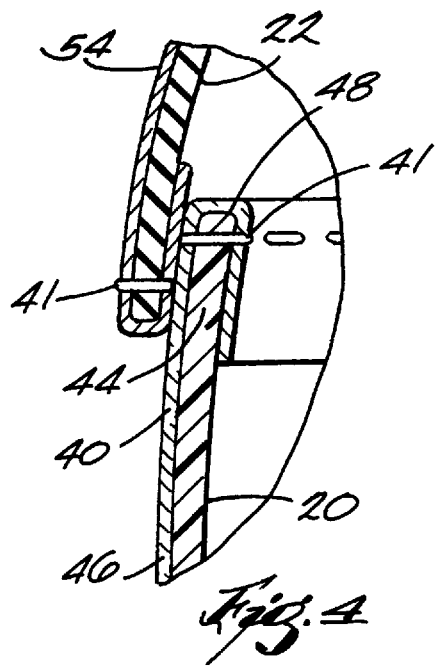
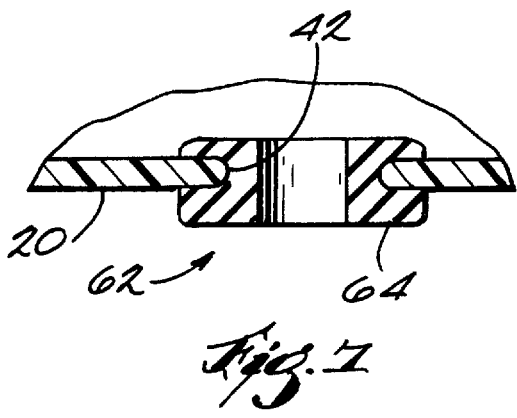

MOTORCYCLE SADDLEBAG

FIELD OF THE INVENTION

The present invention generally relates to the field of motorcycle saddlebags.

BACKGROUND OF THE INVENTION

The use of motorcycle saddlebags is nearly as old as motorcycles themselves because of the greatly enhanced utility they give a motorcycle. Motorcycle saddlebags typically come in one of two arrangements. In the first arrangement, the motorcycle saddlebags are large, rigid, and functional. Such saddlebags may be seen, for example, on touring motorcycles. Typically, such saddlebags are made of continuous fiberglass bodies resulting in a substantially waterproof container. Furthermore, such saddlebags can include locking or latching mechanisms that make them convenient to use. In the second arrangement, motorcycle saddlebags retain a more traditional look and feel, thereby providing a more aesthetic appeal. Such saddlebags are typically constructed of a more rigid material (e.g., leather), and are used on more traditional-looking motorcycles. These saddlebags also commonly use straps and buckles for holding the lid closed. While leather saddlebags can be treated to repel water, they are never truly waterproof, and typically require repeated waterproof treatment.

SUMMARY OF THE INVENTION

The motorcycle saddlebag of the present invention combines features that make the saddlebag more convenient and useful in operation with features that give the saddlebag a more traditional and aesthetically pleasing appearance. In this way, the invention accomplishes many of the benefits of both types of motorcycle saddlebags. In accordance with these objectives, the invention incorporates a number of features. First, the invention incorporates a construction which allows the outside of the saddlebag to retain a traditional leather cover, while the inside is constructed of more rigid materials to maintain the shape and usefulness of the saddlebags. Second, an improved hinge spring design is used to enhance the utility of the saddlebags, especially in combination with the improved construction. Third, an improved fastener system is provided which permits the saddlebags to be quickly and easily opened or closed, but which retains a more traditional look of straps and buckles.

More particularly, the invention provides a motorcycle saddlebag comprising a saddlebag body that is formed of a substantially continuous plastic shell having an exterior surface and defining an interior volume, and further defining an opening providing access to the interior volume. A body cover is provided that is made of a flexible material (e.g., leather) and formed over at least a portion of the exterior surface of said saddlebag body. A lid may be provided that is attached to the saddlebag body such that the saddlebag lid substantially covers the opening in the saddlebag body. The lid comprises a plastic shell having an exterior surface, and a lid cover that is made of a flexible material (e.g., leather) and formed over at least a portion of the exterior surface of the saddlebag lid. In this way, the saddlebag provides a plastic inner shell that is durable, weatherproof, and functional, and an outer cover that is aesthetically pleasing.

The invention also provides a method of manufacturing such a saddlebag for a motorcycle including blow molding a saddlebag body out of plastic, forming a body cover out of a flexible material (e.g., leather) to fit the outside of the saddlebag body, and securing the body cover to the body. The cover may be connected directly to a lip of the saddlebag, such as by stitching.

The invention further provides a unique fastener assembly that holds the body to the lid. The fastener assembly includes a first fastener and a second fastener that are connected in series such that both the first and second fasteners must be fastened to hold the body to the lid. For example, the first fastener can be an aesthetically-pleasing strap and buckle fastener, and the second fastener can be a quickrelease type that is at least partially hidden by the first fastener.

The invention further provides an improved hinge design interconnecting the body with the lid, thereby allowing the lid to pivot relative to the body between a closed position and an open position. A biasing member is positioned adjacent to the hinge and functionally attached to the body and to the lid, and is arranged to bias the lid open when the lid is near the open position. Preferably, the biasing member can be arranged to also bias the lid closed when the lid is near the closed position.

BRIEF DESCRIPTION OF THE DRAWINGS

FIG. 1 is a perspective view of a motorcycle saddlebag embodying the present invention.

FIG. 2 is a side view of the motorcycle saddlebag from the side facing the motorcycle.

FIG. 3 is a front view of the motorcycle saddlebag in partial cross-section.

FIG. 4 is a cross section of the saddlebag body and lid along line 4—4 of FIG. 3.

FIG. 5 is a cross section of the saddlebag body along line 5—5 of FIG. 3.

FIG. 6 is a cross section of the saddlebag body along line 6—6 of FIG. 2.

FIG. 7 is a cross section of the saddlebag body along line 7—7 of FIG. 2.

FIG. 8 is a side view of a spring and hinge according to the present invention.

FIG. 9 is a rear view of the spring and hinge of FIG. 8.

FIG. 10 is a perspective assembly view of a fastener assembly according to the present invention.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION OF THE PREFERRED EMBODIMENT

FIGS. 1 through 3 show a motorcycle saddlebag 10 embodying the invention. A right side (as defined by the right side of the motorcycle) saddlebag is shown to illustrate the invention. A left side saddlebag may be identically reflected on the other side of the motorcycle. The side of the saddlebag 10 shown in FIG. 1 faces outward and away from the motorcycle. The outward facing side 12 includes some ornamental features in order to give the saddlebag 10 a pleasing and traditional appearance. The inward facing side 14 of the saddlebag 10 is shown in FIG. 2, and is the side of the saddlebag 10 that is attached to the motorcycle. FIG. 3 shows a horizontal view of the saddlebag 10, and specifically of the forward facing side 16, as defined when the saddlebag 10 is mounted to a motorcycle. As shown in FIG. 1, the saddlebag 10 tapers slightly toward the rearward facing side 18 of the saddlebag 10.

The saddlebag 10 includes a body 20, a lid 22 and a pair of hinges 24 that attach the lid 22 to the body 20. The lid 22 pivots upward or hinges along one of its edges to allow access to the inside of the saddlebag 10 through a top opening 26 in the body 20. Referring to FIG. 3, the saddlebag body 20 defines an interior volume 28, and the body 20 and lid thus include interior surfaces 30 and exterior surfaces 32. The saddlebag 10 is shown in the figures with the lid 22 closed. The open position of the lid 22 is shown by the dashed line in FIG. 3.

The lid 22 pivots about an axis 36 that is adjacent to the top inside edge of the saddlebag 10. In this way, the saddlebag 10 can be opened without the lid 22 interfering with the motorcycle. A fender 38 or saddle of the motorcycle is shown by dashed line to illustrate how this may be accomplished. Of course, the saddlebag 10 of the invention may be configured in many possible shapes and having many possible body and lid configurations.

The body 20 comprises a substantially continuous, substantially rigid shell, preferably made of HDPE. The sidewalls and bottom wall of the lid 22 are essentially continuous, without any substantial openings except for the upward facing opening 26 that may be covered by a lid 22. There are, in the illustrated embodiment, a pair of small holes 42 (FIG. 7) in the plastic body 20 that are used to mount the body 20 to the motorcycle. Nevertheless, the saddlebag 10 may be essentially closed and sealed from the outside by covering the opening 26 with a lid 22. The body is also substantially rigid, as distinguished from a saddlebag made from a flexible material such as nylon or leather. For example, the body can be made of plastic or fiberglass.

In the preferred embodiment, the saddlebag bodies 20 are manufactured in pairs in each operation, then cut apart. The bodies are formed by blow molding to the desired shape. Specifically, the plastic is inserted into the mold with an expandable tube in the interior of the plastic. The tube is then inflated to expand the plastic to the outside of the mold. Once the plastic is set, the mold is opened, and the pieces are separated from each other.

The outward facing portion of the body 20, comprising the outward, forward and rearward facing sides 12, 16, 20, includes a body cover 40 that is attached to the outside of the body 20. The inward facing portion of the body 20, comprising inward facing side 14 shown in FIG. 2, rests against the motorcycle and is therefore preferably not covered by leather, in order to reduce costs. The body cover 40 is made from a flexible material, such as leather. Additionally, the interior surface of the body 20 may be lined with cloth, vinyl, or leather, to provide additional pockets or merely to enhance the aesthetic appeal.

The body cover 40 is stretched, cut, and fitted over the exterior of the body 20. In the preferred embodiment, as noted above, a leather cover is employed for a more authentic appearance. However, according to the invention, any flexible material may be used to cover the body 20 or the lid 22. For example, artificial leather, vinyl, or fabric would give the saddlebag 10 a distinctive appearance. The body cover 40 may be attached to the body 20 by stitching directly to the body 20. The stitched construction creates a more traditional and authentic appearance, similar to most leather saddlebags. In addition, the leather cover is only secured to the body 20 by stitches 41 at the perimeter or edge portion 44 of the body cover 40. In this way, the middle portion 46 of the body cover 40 is not directly secured to the body 20, and may hang slightly, thereby giving a still more authentic appearance.

As shown in FIGS. 4 and 5, the stitching of the body cover 40 to the body 20 is facilitated by providing a lip 48 on the body 20. The body cover 40 is then folded over the lip 48, and stitches 41 are passed through the sandwiched layers of leather and plastic. The lip 48 may be merely the perimeter of the plastic shell. For example, as shown in FIG. 4, on the forward, rear, and outside sides of the body 20, a lip 48 is provided by the top of the body 20 at the opening 26. On the inward facing side 14 of the body 20, a lip 48 is provided at the forward and rear edges, as shown in FIG. 2. In a similar fashion, as shown in FIG. 5, the body cover 40 is folded over the lip 48 and secured. On the bottom of the body 20 on the inward facing side 14 of the motorcycle, the body cover 40 is held in place by securing the body cover 40 between a bar support 50 and the body 20 and then riveting through the bar support, the body cover 40, and the body 20. As shown in FIG. 6, the body cover 40 is then tightly held by the rivets 52 and by the pressure between the bar support 50 and the body 20.

The saddlebag lid 22 may also be formed of plastic and then covered with a leather cover. Because the lid 22 is shallower than the body 20, a vacuum molding process is sufficient to form the desired shape. A lid cover 54 is then formed over the lid 22 and may also be attached directly to the lid 22 by stitches 41. In similar fashion to the body 20, the lid cover 54 may be secured to the outer lip of the lid 22 at the edge portion 56 of the lid cover 54, and left substantially unsecured in the middle portion 58. To enhance the sealing between the body 20 and the lid 22, a rubber seal 60 may be added at the upper inside edge of the body 20 where the lid 22 hinges.

In this way, the invention provides a saddlebag 10 having a plastic shell interior and a leather exterior.

The plastic interior helps the saddlebag 10 to maintain a rigid form and is durable and weather resistant. The leather exterior has a traditional look and feel, and therefore can be integrated into an aesthetically pleasing motorcycle. Also, the outer leather body cover 40 and lid cover 54 may be made from a thinner leather than if the bag were completely made of leather because it does not need to be rigid. For example, 5–6 oz. leather may be used instead of 8–9 oz. leather that is commonly used in all-leather saddlebags. The thicker leather is more costly, is heavier and may be limited in availability.

The saddlebag 10 attaches to the motorcycle at several points. In FIG. 2, the side of the motorcycle saddlebag 10 that faces the motorcycle is shown. Two mounts 62 are positioned in the holes 42 that are adapted to connect the saddlebag 10 to the motorcycle. The fasteners (not shown) that fit through the mounts may be, for example, Dzus quick release fasteners (DZUS is a registered trademark of Dzus Fastener Co., Inc. of New York). As shown in FIG. 7, the mounts 62 each preferably comprise a rubber grommet 64 between the fastener and the saddlebag body 20, in order to partially isolate the saddlebag 10 from motorcycle vibration. The bar support 50 along the bottom of the saddlebag 10 is configured to engage a "candy-cane" style support bar on the motorcycle. As shown in FIG. 3, the bar support 50 is under the saddlebag 10 to engage a corresponding bar on the motorcycle to carry the majority of the load of the saddlebag 10.

Each hinge 24 is mounted on hinge brackets 66 that are attached to the body 20 and to the lid 22 by means of fasteners such as rivets 68. The hinge brackets are shaped to set the hinge 24 off of the saddlebag 10 in order to clear the saddlebag 10. As shown in FIG. 3, the hinge 24 of the present invention pivots from a substantially flat position in which the saddlebag 10 is closed to about a 90 degree angle in which the saddlebag 10 is open. A biasing member in the form of a spring 70 is provided to hold the lid 22 in the open position. The spring 70 is C-shaped and attached to the saddlebag 10 adjacent to the hinge 24. In particular, the spring 70 is functionally interconnected with the lid 22 at one location and the body 20 at a second location and curves around the hinge 24. In the illustrated embodiment (FIG. 9), the C-shaped spring engages slots 72 in the hinge brackets 66 of the hinge 24, which are attached to the body 20 and the lid 22.

The spring 70 is designed such that the spring 70 forces the motorcycle saddlebag 10 closed when the lid 22 is near to a closed position and holds the lid 22 open when the lid 22 is near the open position. This is accomplished by using an over center spring design. In other words, the spring 70 forces the body 20 and lid 22 together at the slots 72 where the spring 70 engages the body 20 and lid 22. When these slots 72 are on one side of the pivot axis 36 (as defined by the hinge 24), then the spring 70 will tend to compress toward that side.

As shown in FIG. 1, the lid 22 may be held closed by several fastener assemblies 74. A first fastener assembly is illustrated in a fastened position, and a second fastener assembly is illustrated in an unfastened position. FIG. 10 shows details of a fastener assembly 74 or connector according to the present invention. Such a fastener assembly 74 is used to connect the lid 22 to the body 20.

More particularly, the fastener assembly 74 comprises a first fastener 88 and a second fastener 86. The duplicative fastener design permits one fastener to be made more aesthetically pleasing, and the other fastener to be quick and convenient.

The illustrated first fastener 88 comprises an upper strap 80 and a buckle 84 with a buckle pin 90 that engages one of several holes 92 in the strap 80. The buckle 84 may be made of chromed metal for an aesthetically pleasing and durable part. The illustrated second fastener 86 is a Fastex® (FASTEX is a registered trademark of Illinois Tool Works of Illinois) quick-release nylon plastic clip that is quick and convenient to use, but also solid and secure. The clip includes a male end portion 96 attached to the buckle 84 by an intermediate strap 97 and a female end portion 98 attached to the body 20 by a lower strap 82 that is fastened, such as by rivets, to the body 20. In this way, the first and second fasteners 88 and 86 are connected in series such that unfastening either fastener releases the lid 22 from the body 20.

Preferably, the intermediate strap 97, the lower strap 82 and the second fastener 86 are narrower than the upper strap 80 that is threaded through the buckle 84. In this way, the upper strap 80 and the buckle 84 hang over the second fastener 86 and thereby substantially hide the second fastener 86 from view. A side view of the fastener assembly 74 is shown in FIG. 3, which illustrates that the second fastener 86 is sandwiched between the upper strap 80 and the body 20. Because the second fastener 86 releases by applying pressure to the sides, the second fastener 86 may still be quickly and easily operated. If desired, a loop 99 can be provided to hold the end of the strap 80 in place.

While the several embodiments of the present invention has been shown and described, alternative embodiments will be apparent to those skilled in the art and are within the intended scope of the present invention. Therefore, the invention is to be limited only by the following claims:

What is claimed is:

1. A motorcycle saddlebag comprising:

a body defining an interior volume and having an opening for providing access to the interior volume;

a lid attached to said body such that said lid substantially covers the opening in said body; and a fastener assembly that holds said body to said lid, said fastener assembly comprising a first fastener associated with one of said lid and said body and including a buckle and a strap extending through said buckle, and a second fastener having a first part connected in series to said first fastener and a second part associated with the other of said lid and said body and connectable with said first part such that both said first and second fasteners must be fastened to hold said body to said lid, wherein said strap of said first fastener is wider than said second fastener whereby said first and second parts of said second fastener are substantially hidden by said strap of said first fastener.

2. A saddle bag of claim 1, wherein said strap of said first fastener is attached to said lid and said second part of said second fastener is attached to said body.

3. The saddlebag of claim 1, wherein said first and second parts of said second fastener comprises a quick release clip.

4. A saddlebag according to claim 1, wherein said second fastener is narrower than said first fastener.

5. A motorcycle saddlebag comprising:

a body defining an interior volume and having an opening for providing access to said interior volume;

a lid attached to said body such that said lid substantially covers the opening in said body; and a fastener assembly that holds said body to said lid, said fastener assembly including
a first fastener including a strap associated with one of said lid and said body and a buckle connectable with said strap,
an intermediate strap attached to said buckle, and
a second fastener having a first part connected in series to said buckle by said intermediate strap and a second part associated with the other of said lid and said body, said second part being connectable with said first part such that both said first and second fasteners must be fastened to hold said body to said lid.

6. The motorcycle saddlebag claimed in claim 5, wherein said first and second parts of said second fastener comprises a quick release clip.

7. The motorcycle saddlebag claimed in claim 5, wherein said strap is wider than said first and second part of said second fastener whereby said second fastener is substantially hidden by said strap of said first fastener.

8. The motorcycle saddlebag claimed in claim 5, wherein said second fastener is narrower than said first fastener.

9. The motorcycle saddlebag claimed in claim 5, wherein said strap of said first fastener is attached to said lid and said second part of said second fastener is attached to said body.

* * * * *